United States Patent

[11] 3,552,461

| [72] | Inventor | Stephen A. Paoli<br>520-6th St., Rockford, Ill. 61108 |
|------|----------|--------------------------------------------------------|
| [21] | Appl. No. | 799,763 |
| [22] | Filed | Feb. 17, 1969 |
| [45] | Patented | Jan. 5, 1971 |

[54] SEPARATOR MACHINE FOR BONELESS COMMINUTED MEAT AND OTHER FOOD PRODUCTS
10 Claims, 9 Drawing Figs.

[52] U.S. Cl. .................................................. 146/76, 146/91, 146/174, 146/182
[51] Int. Cl. ............................................................. A22c 17/00
[50] Field of Search ............................................. 146/89, 91, 92, 76, 174, 182, 184

[56] References Cited
UNITED STATES PATENTS

| 3,266,542 | 8/1966 | Paoli ............................. | 146/76 |
| 3,356,119 | 12/1967 | Kirkpatrick et al. .......... | 146/174 |

Primary Examiner—Willie G. Abercrombie
Attorney—Wolfe, Hubbard, Leydig, Voit & Osann ABSTRACT: An improved separator machine for the continuous production of boneless comminuted meat and other smooth comminuted food products. The machine is adapted to receive raw material, such as a dressed animal carcass or any portion thereof, or whole fruit or vegetables, reduced to a coarse agglomeration of fragmented hard and soft tissues which are separated automatically and continuously and discharged separately. The machine incorporates an improved feeding means which increases its productivity and eliminates the necessity for manual intervention.

PATENTED JAN 5 1971

INVENTOR
STEPHEN A. PAOLI by: Wolfe, Hubbard, Voit & Osann
ATTYS.

PATENTED JAN 5 1971
3,552,461
SHEET 2 OF 3
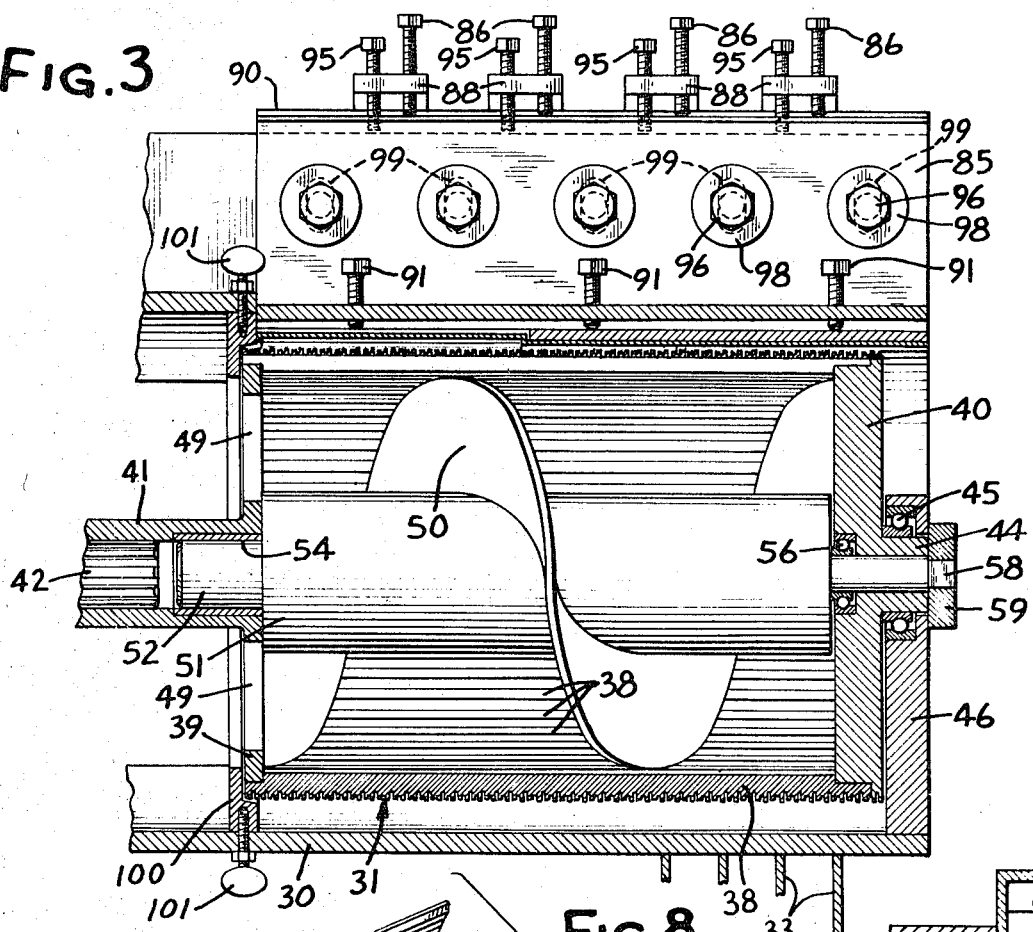
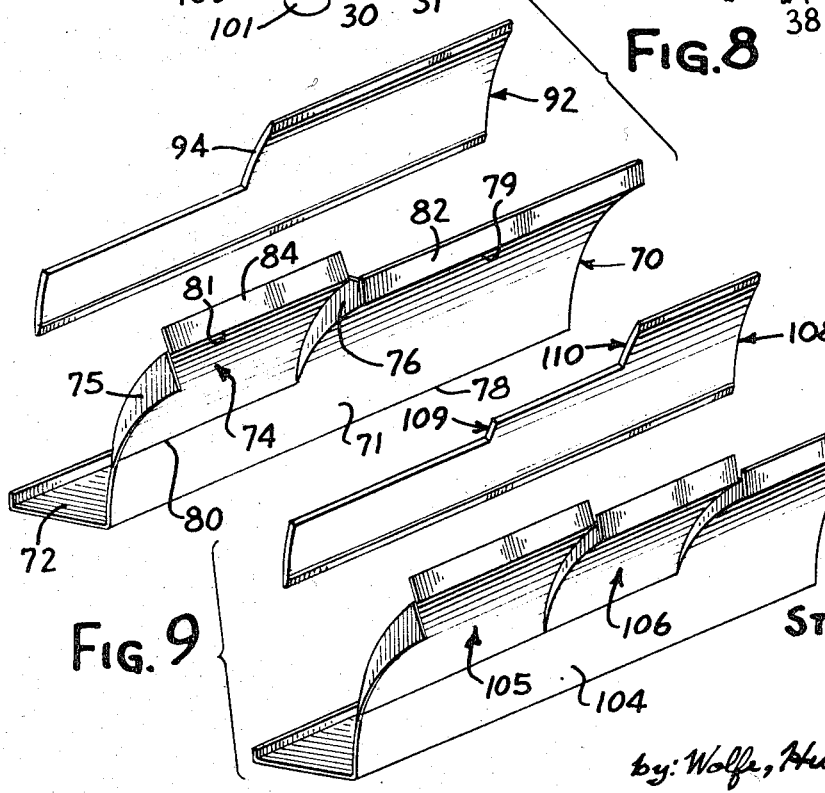
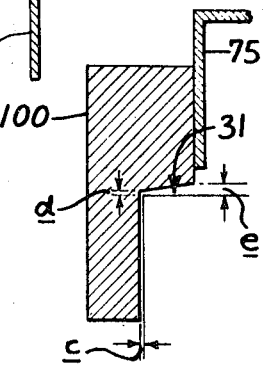
INVENTOR
STEPHEN A. PAOLI
by: Wolfe, Hubbard, Voit & Osann
ATTYS.

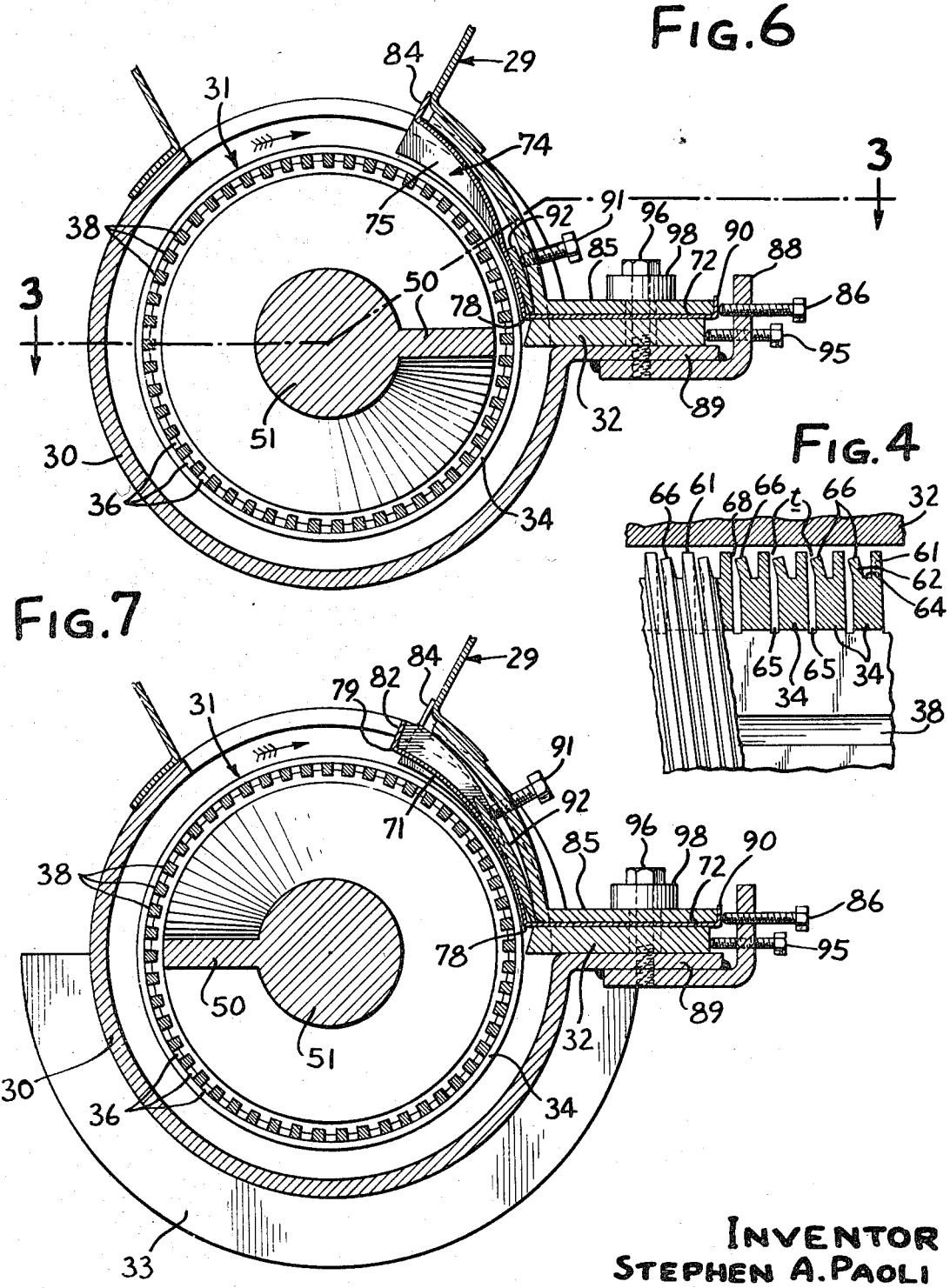

SEPARATOR MACHINE FOR BONELESS COMMINUTED MEAT AND OTHER FOOD PRODUCTS

DESCRIPTION OF THE INVENTION

The present invention relates to food processing machinery and, more specifically, to a machine for producing boneless comminuted meat and other such smooth comminuted food products from raw material such as a dressed animal carcass or any portion thereof, or whole fruit or vegetables, which has been reduced to a coarse agglomeration of fragmented hard and soft tissues. The invention represents an improvement over the machine disclosed and claimed in my prior U.S. Pat. No. 3,266,542, issued Aug. 16, 1966.

The term "boneless comminuted meat," as used herein, denotes comminuted meat with substantially no entrained bone, cartilage, gristle, sinew or the like readily perceptible to the touch when held between the fingers. The term "dressed animal carcass," as used herein, denotes a conventional dressed whole carcass of a meat animal, such as beef, pork, or lamb; a conventional dressed whole carcass of poultry, such as chicken or turkey; and a gutted but otherwise whole carcass of fish, including scales and fins. The term "portion," as applied herein to a dressed animal carcass, denotes any part thereof, such as a prime cut of beef or pork, also referred to as "red meat;" a neck, wing, or back of chicken or turkey; or a headed and gutted fish from which the filets have been removed. The term "smooth comminuted food products," as used herein, refers to the comminuted soft tissues of foods such as whole fruit or vegetables, with substantially no entrained fragments of hard tissue readily perceptible to the touch when held between the fingers.

One object of the present invention is to provide a machine for the continuous production of boneless comminuted meat and other smooth comminuted food products from a coarse agglomeration of fragmented hard and soft tissues by automatically and continuously removing those fragments perceptible to the touch, said machine having an improved feeding means incorporated therein enabling it to produce at a substantially greater yield, and hence greater efficiency, than machines of the type heretofore known.

Another object of the invention is to provide an improved machine of the character set forth which will require little, if any, manual intervention at the loading station.

Still another object is to provide an improved machine as above set forth and of simple, rugged construction adapted for easy disassembly and cleaning, complying in all respects with the high sanitation standards applicable to such machines.

Other objects and advantages will become apparent as the following description proceeds, taken together with the accompanying drawings, in which:

FIG. 3 is an enlarged fragmentary sectional view taken through the illustrative machine in the plane of the line 3–3 of FIG. 6.

FIG. 4 is a further enlarged fragmentary sectional view taken longitudinally of the revolvable member of the machine along the adjacent edge of the pressure bar.

FIG. 5 is a further enlarged fragmentary vertical sectional view detailing the stop ring and left end portion of the revolvable member of the machine as shown in FIG. 2.

Figure 2:
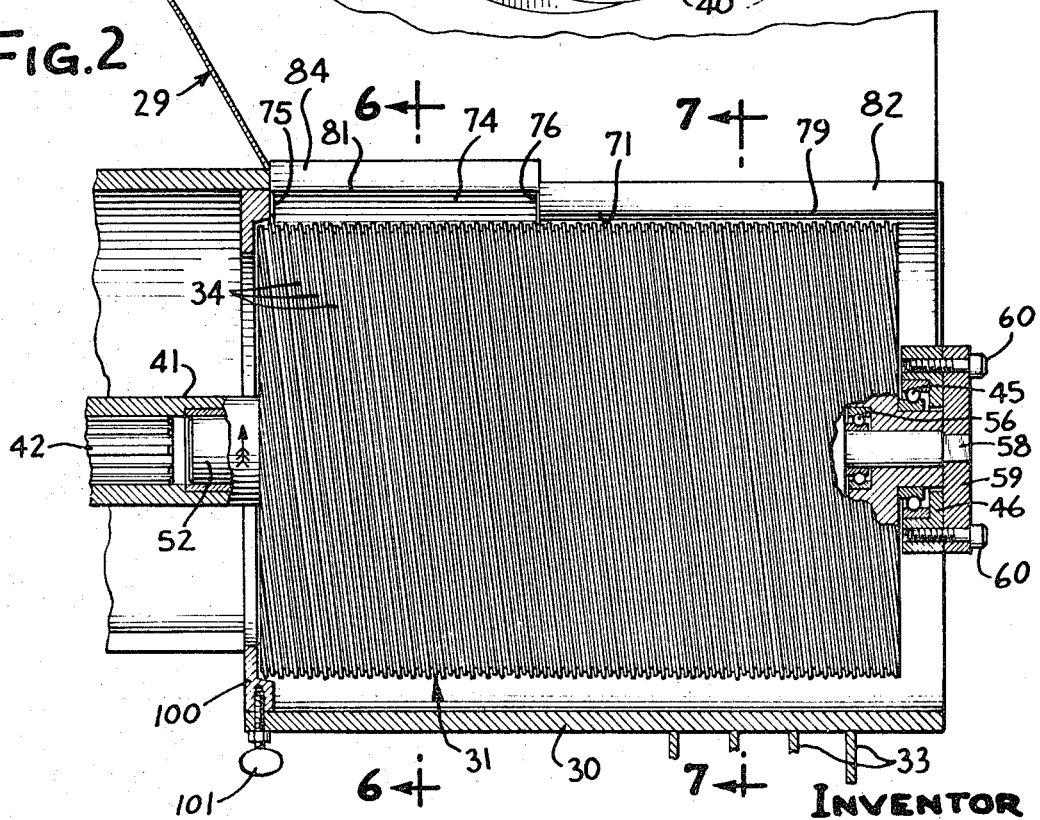
FIG. 2 is an enlarged fragmentary vertical sectional view taken longitudinally through the machine of FIG. 1.

FIGS. 6 and 7 are fragmentary sectional views taken transversely through the machine as shown in FIG. 2, in the planes of the lines 6–6 and 7–7, respectively.

Figure 1:
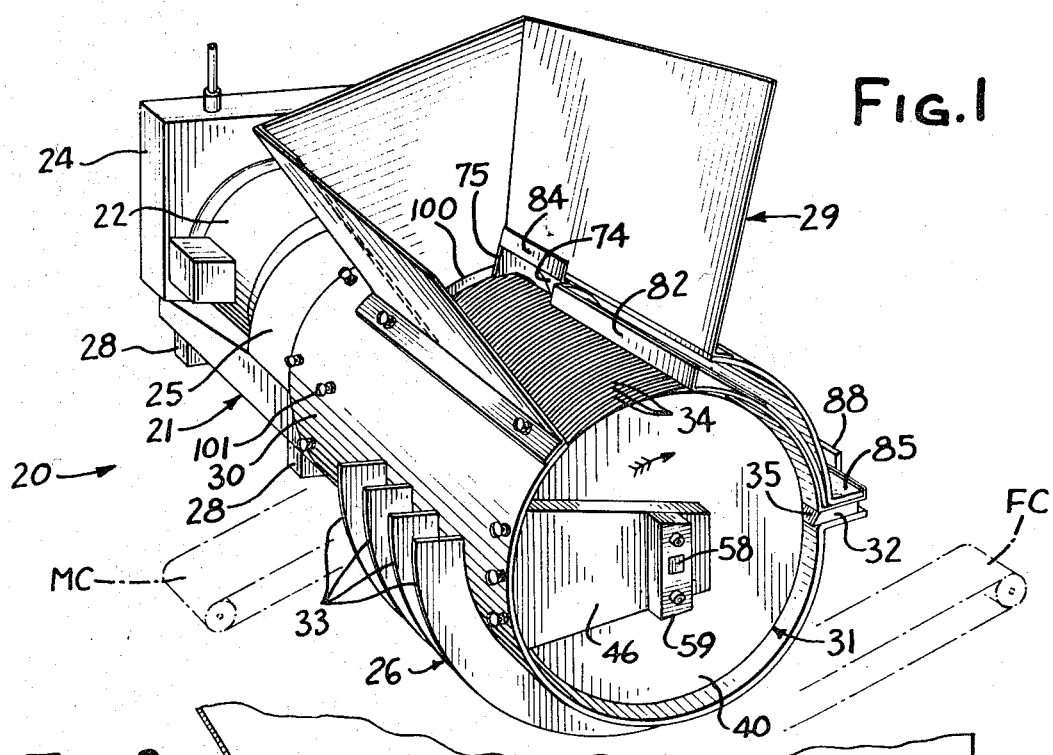
FIG. 1 is a perspective view of an illustrative machine for producing boneless comminuted meat and smooth comminuted food products, and which exemplifies the present invention.

FIG. 8 is an exploded perspective view of the regulator plate and backup plate of the machine of FIG. 1.

FIG. 9 is an exploded perspective view similar to FIG. 8 but showing a modified form of regulator plate and backup plate adapted for use with machines of the type exemplified in FIG. 1.

While the invention is susceptible of various modifications and alternative constructions, certain illustrative embodiments have been shown in the drawings and will be described below in considerable detail. It should be understood, however, that there is no intention to limit the invention to the specific forms disclosed but, on the contrary, the intention is to cover all modifications, alternative constructions, and equivalents falling within the spirit and scope of the invention as expressed in the appended claims.

Referring more specifically to FIG. 1, the present invention is there exemplified in an illustrative machine 20 generally similar in organization to the machine disclosed in my prior Pat. No. 3,266,542, supra. The machine 20 comprises a base assembly 21 which supports a drive motor 22 and controller 24, a reduction gear 25, and a separator unit 26. The base assembly 21 in this case is provided with feet 28 adapted for mounting on an appropriate support with the separator unit extending in overhanging relation therefrom. Raw material in the form of a coarse agglomeration of fragmented hard and soft tissues of meat, or other food product such as whole fruit or vegetables, is received from a grinder or other suitable reducing device (not shown) and loaded into the machine separator unit 26 via hopper 29. The hard and soft tissues are automatically and continuously separated in the unit 26. The boneless comminuted meat or other smooth comminuted food product is discharged at the inboard end of the separator unit into a suitable conveyor or other collecting device shown diagrammatically as MC. The separated fragments of bone and other hard tissue are discharged at the outboard end of the separator unit into a suitable collecting device shown diagrammatically as FC and which may also be a conveyor.

The separator unit 26, like that disclosed in my aforesaid patent, comprises a generally cylindrical casing 30 which houses a power driven revolvable member 31 and a cooperating pressure bar 32. The casing 30 may include one or more arcuate stiffening flanges 33 adjacent its outboard end. The member 31 is fashioned as a hollow cylindrical rotor with a plurality of relatively thin, helical cutting elements 34 disposed in closely spaced relation on its outer peripheral surface. The spaces between the cutting elements 34 communicate with the interior of the member 31 and have a width on the order of 0.008 inch which is somewhat smaller than the average diameter of the smallest fragments to be removed. The pressure bar 32 is mounted longitudinally of the revolvable member 31 and has an adjacent edge 35 tapering progressively closer to the member 31 in the direction of movement of the latter. The bar 32 is set at a clearance distance with respect to the member 31 which may be on the order of 0.007 — 0.010 inches.

The revolvable member 31 has a plurality of longitudinal slots 36 in its interior wall extending to the root diameter of the cutting elements 34 and connecting with the grooves therebetween (FIGS. 3, 4, 6, 7). The slots 36 define a corresponding series of longitudinal lands 38 in the wall and which are integral with the cutting elements 34 for structural rigidity. The member 31 has an end plate 39 rigidly fixed to its inboard end and an opposed end plate 40 detachably fixed to its outboard end. The end plate 39 (FIGS. 2, 3) is formed with an integral drive sleeve 41 adapted in this instance to telescopically interfit with the projecting end of power shaft 42 which is driven by the motor 22 via reduction gear 25. The sleeve 41 and shaft 42 may be suitably splined or keyed to form a detachable drive coupling. The end plate 40 (FIGS. 2, 3) is formed with an integral hub 44 which is journaled as by means of ball thrust bearing 45 in stationary support plate 46. The latter is detachably mounted at the outboard end of the casing 30 and secured in place as by screws 48 (FIG. 1).

The end plate 39 is formed with meat discharge apertures 49. Boneless comminuted meat is removed from the revolvable member 31 and forced through the apertures 49 by means such as a fixed auger 50 having an auger shaft 51 (FIG. 3). The auger shaft has an integral extension 52 at its inboard end which is journaled as by means of sleeve bearing 54 in drive sleeve 41. The auger shaft also has an integral extension 55 at its outboard end extending through antifriction bearing 56 in end plate 40. The projecting end 58 of the auger shaft extension 55 is squared or otherwise shaped to interfit with a fixed bracket 59 secured to the plate 46 as by means of cap screws 60 (FIGS. 1—3).

Turning now to FIG. 4, it will be noted that the outer peripheral portion of each helical cutting element 34 has in this instance a pair of ribs 61, 62 formed therein. The ribs 61, 62 are separated by a blind groove 64 and diverge from each other in cross section. One of the ribs, in this instance the rib 61, is radially longer in cross section than the rib 62 by an amount which may, for example, be on the order of 0.015 inch measured radially. Also, in this instance, the rib 62 is inclined away from the mating rib 61 of its pair and toward the rib 61 of the adjacent cutting element convolution 34. This inclination of the rib 61 defines a constricted throat $t$ in the open groove or passage 65 between adjacent cutting element convolutions. The throat $t$, which may be on the order of 0.008 inch in width, is located adjacent the pressure face at the outer peripheral surface of the ribs. In addition, the throat $t$ is situated at the apex of a pocket defined by the outer peripheral face 66 of the rib 62 and that portion 68 of the side face of adjacent rib 61 projecting radially beyond the peripheral face 66. This pocket configuration, together with the radially and axially spaced cutting edges on the rib elements, enhances the cutting and feeding of fragment-free comminuted meat or other smooth comminuted food product into the passages 65 as the member 31 moves past the pressure bar 32.

The helical cutting elements 34 may be arranged on the revolvable member 31 at various helix angles. In the present instance, and referring more specifically to FIGS. 1 and 2, it has been found satisfactory to arrange the cutting elements 34 with a pitch of about one turn in 3 inches on a revolvable member approximately 12 inches in diameter, utilizing 30 such cutting elements 34 started at equal angular intervals of 12 degrees. This gives the member 31 ten cutting elements 34 and ten constricted throat passages 65 per inch of axial length. A revolvable member 31 constructed as above set forth produces excellent results with poultry, red meat, and various fruits when operated at a speed of about 125 r.p.m.

In accordance with an important aspect of the invention, provision is made for controlling the introduction of the coarse agglomeration of raw material into the work zone of the separator unit 26 automatically in such manner that the yield and efficiency, and hence the productivity, of the machine are increased substantially. This is accomplished by directing the raw material into the most active part of the work zone as an incident to its introduction, utilizing the motive action of the separator unit for such purpose. Referring again to FIGS. 1 and 2, it will be noted that the machine is arranged so that the great bulk of incoming raw material will be deposited on the left hand or drive end portion of the revolvable member 31, with perhaps a small amount scattered at random over its remaining exposed surface within the perimeter of the hopper. This material is initially accelerated and revolved with the outer peripheral surface of the member 31. It is then directed into the active portion of the work zone of the separator unit 26 by means of a novel regulator plate 70 which operates in conjunction with the revolvable member 31 and the pressure bar 32 to define the work zone.

As shown more specifically in FIGS. 1, 2, 6, 7 and 8, the regulator plate 70 comprises a concave spreader face 71 spaced apart in nested relation with the outer peripheral face of the revolvable member 31, and a mounting flange 72 which is adjustably clamped to the pressure bar 32. The upper left end portion of the regulator plate 70, as viewed in FIGS. 1, 2 and 8, and is formed with a relatively long arcuate pocket 74 which diverges outwardly and upwardly from the concave spreader face 71 of the regulator plate and the outer peripheral surface of the member 31. The pocket 74 may extend from the drive end of the revolvable member 31 longitudinally thereof of for approximately 33 percent to 50 percent of its length, being bounded at the drive end by an arcuate flange 75 and at its opposite end by a tapered abutment 76 which serves as a retaining wall. The abutment 76 may run circumferentially of the member 31 or it may extend somewhat angularly downward toward the drive end of the member 31, causing the pocket 74 to taper in width as well as thickness toward the work zone.

The regulator plate 70 is mounted in operative position above the pressure bar 32 so that the lower edge 78 of its concave spreader face 71 is spaced from the surface of the member 31 by a clearance corresponding to that of the pressure bar, in other words a clearance on the order of 0.007-—0.010 inch (FIG. 4). The concave face 71 tapers secantially outwardly and upwardly toward the hopper with its upper edge 79 spaced from the surface of member 31 by a clearance distance on the order of 0.375 inch (FIG. 7). The plate 70 is so constructed that, with the foregoing setting, the lower edge 80 of the pocket 74 will be situated at a point approximately one-third the distance from the edge 78 to the edge 79, with an approximate clearance on the order of 0.125 inch with respect to the member 31. Since the depth of the pocket 74 at the top happens in this instance to be 0.750 inch, the clearance between its upper edge 81 and the member 31 would be approximately 1.125 inches (FIG. 6). The free edge of the flange 75 tends to follow generally the curvature of the spreader plate 71 but extends somewhat closer to the member 31, terminating at a clearance distance of approximately 0.125 inch with the member 31. The upper portion of the regulator plate 70 terminates in upturned flanges 82, 84 extending up into the hopper (FIGS. 46, 6, 8).

When the regulator plate 70 is mounted in the manner just described, a high pressure work zone is defined between approximately the lower one-third of the spreader face 71, the inclined face of the pressure bar 32, and the peripheral cutting elements 34 on the revolvable member 31. The angular or helical disposition of the cutting elements 34 and the clockwise movement of the revolvable member 31 (as viewed from its outer end), tend to move raw material through the work zone toward the outer end of the separator unit. In the course of such movement, boneless comminuted meat or other smooth comminuted food product passes into the interior of the member 31 via the constricted passages 65 and is then directed in the opposite direction by the fixed auger 50 to the discharge apertures at the drive end of the member 31. At the same time, perceptible fragments of bone or other hard tissue are picked up by the peripheral grooves in the outer surface of the member 31 and positively moved to a discharge point at the outer end of the separator unit. The great bulk of the raw material entering the hopper drops onto the surface of the member 31 adjacent its drive end and is carried into the pocket 74. The material is restrained by the tapered abutment or retaining wall 76 from moving longitudinally of the revolvable member 31 until it has been wedged down into the high pressure work zone where the positive separating action of the cutting elements 34 is most pronounced and effective. Because of this factor, and also because movement of loose and bulky raw material axially of the member 31 from the upper region of the pocket is precluded, the yield, efficiency, and hence the productivity, of the machine is greatly enhanced. The increased yield factor may, for example, be on the order of 15 percent more than that obtained with machines of the type heretofore known.

As noted earlier herein, and referring again to FIGS. 3, 6 and 7, in the present instance the regulator plate 70 is adjustably clamped against the upper face of the pressure bar 32. This is effected by means of the mounting flange 72 and holddown plate 85. The plate 70, including its spreader face 71 and pocket 74, may be adjusted for clearance with respect to the revolvable member 31 as by means of a series of adjusting screws 86. The latter engage tapped holes in fixed adjusting brackets 88 secured to the outwardly extending casing flange 89 that supports the pressure bar. The screws 86 bear against a relatively narrow upturned flange 90 which in turn bears against the outer edge of the holddown plate 85. The regulator plate 70 may be adjusted for orientation generally radially of the member 31 by means of a series of screws 91 situated at longitudinally spaced intervals in the casing 30 and adapted to bear against back up plate 92. As shown in FIG. 8, the back up plate 92 in this case is fashioned with a relieved area 94 in the vicinity of the pocket 74. It should be borne in mind, however, that the back up plate could also be made in two sections, one overlying the pocket 74 and the other overlying the convex side of the spreader face 71. The brackets 88 also carry a series of adjusting screws 95 for the pressure bar 32. After adjustment, the pressure bar 32 and regulator plate 70 are secured in place by locking screws 96 which engage tapped holes in the brackets 88 and casing flange 89, engaging the holddown plate 85 by means of collars 98. The holddown plate 85 and mounting flange 72 of the regulator plate are fashioned with oversize or elliptical holes 99 to provide flexibility of adjustment.

In order to preclude leakage of unprocessed raw material into the boneless comminuted meat or smooth comminuted food product discharged via apertures 49 at the drive end of the member 31, resort is had to a fixed sealing ring 100 (FIGS. 1, 2, 3 and 5). The ring 100 has an outer diameter adapted to fit snugly within the interior diameter of the casing 30. In the present instance, the sealing ring 100 is counterbored to fit telescopically over the end portion of the member 31, giving it a generally L-shaped cross section. The ring 100 is mounted with a running clearance $c$ of approximately 0.006 to 0.008 inch with the inner end face of the member 31. At the edge between the end face and the outer peripheral surface of the member 31, the running clearance $d$ between the counterbore of the ring 100 and such edge may be approximately 0.030 inch. The counterbore flares outwardly away from the drive end of the member 31, terminating with a running clearance $e$ with the surface of the member 31 which may be approximately 0.080 inch. The ring 100 is detachably secured in place as by means of a plurality of retaining screws 101 extending through suitable holes in the casing 30. It is so positioned in the casing that the inner flange 75 of the regulator plate 70 abuts against the overhanging face of the ring 100 when the plate 70 is in operative position (FIG. 5).

Turning now to FIG. 9, it will be noted that a modified form of regulator plate 102 is there shown comprising a concave spreader face 104 and two tapered pockets 105, 106 of progressively decreasing cross section with respect to the revolvable member 31. The regulator plate 102 has associated therewith a back up plate 108 having two relieved areas 109 and 110 corresponding respectively to the pockets 105, 106. The action of the regulator plate 102 is somewhat similar to that of the plate 70 but the former handles the bulky raw material in two steps instead of one. The regulator plate 102 is adaptable to machines like the machine 20 but having relatively longer revolvable members.

I claim:

1. A machine for separating fragments of hard tissue perceptible to the touch from comminuted meat or other comminuted food product and comprising, in combination:
   a. a casing;
   b. a hollow revolvable member mounted in said casing;
   c. a plurality of helical cutting elements on said revolvable member defining a plurality of constricted helical grooves therebetween communicating between the exterior and the interior of said revolvable member;
   d. a pressure bar extending axially of said revolvable member and spaced from said cutting elements by an amount not substantially greater than the smallest width of said constricted helical grooves;
   e. a regulator plate disposed adjacent said pressure bar and in spaced apart nested relation with said revolvable member, said regulator plate having a concave spreader face opposing said revolvable member;
   f. power means for revolving said revolvable member relative to said pressure bar and spreader face;
   g. said spreader face and said pressure bar defining a work zone with said revolvable member and wherein comminuted meat or other food product without perceptible fragments of hard tissue is forced into the interior of said revolvable member and the fragments are moved along the exterior of said revolvable member from one end thereof to a discharge point at the opposite end thereof;
   h. means defining raw material pocket in said spreader face adjacent said one end of said revolvable member and tapering toward said work zone; and
   i. means for removing comminuted meat or other food product from the interior of said revolvable member as the latter revolves.

2. A machine as set forth in claim 1 and including means defining a tapered abutment on the side of said pocket remote from said one end of said revolvable member, said abutment being adapted to restrain movement of raw material axially of said revolvable member prior to entry of said material into the work zone.

3. A machine as defined in claim 1 and including a backup plate disposed in overlying relation with said regulator plate, said backup plate having a relieved area to receive said pocket.

4. A machine as defined in claim 1, including means defining a plurality of tapered pockets in said spreader face.

5. A machine as defined in claim 4, including a backup plate disposed in overlying relation with said regulator plate and having a plurality of relieved areas to receive said pockets.

6. A machine as defined in claim 4, including means defining a tapered abutment on the side of each said pocket remote from said one end of said revolvable member, each said abutment being adapted to restrain movement of raw material axially of said revolvable member prior to entry of said material into the work zone.

7. A machine for the continuous production of boneless comminuted meat or other smooth comminuted food product from raw material in the form of a coarse agglomeration of fragmented hard and soft tissues, said machine comprising in combination:
   a. a casing;
   b. a hollow revolvable member mounted in said casing;
   c. a plurality of helical cutting elements on said revolvable member defining a plurality of constricted helical grooves therebetween communicating between the exterior and the interior of said revolvable member;
   d. power means for revolving said revolvable member;
   e. means defining a work zone with said revolvable member and wherein comminuted meat or other food product without perceptible fragments of hard tissue is forced into the interior of said revolvable member and the fragments are moved along the exterior of said revolvable member from one end thereof to a discharge point at the opposite end thereof;
   f. means for receiving raw material adjacent said one end of said revolvable member;
   g. means for arresting the movement of said raw material axially of said revolvable member until said raw material enters the work zone;
   h. and means for removing comminuted meat or other food product from the interior of said revolvable member as the latter revolves.

8. A machine as defined in claim 7, wherein said raw material receiving means includes a tapered pocket and said arresting means comprises an abutment tapering toward said work zone.

9. A machine as set forth in claim 1, wherein said raw material pocket tapers in width and thickness toward said work zone.

10. A machine as set forth in claim 4, wherein said plurality of raw material pockets taper in width and thickness toward said work zone.